United States Patent [19]
Paulson

[11] Patent Number: 6,010,093
[45] Date of Patent: Jan. 4, 2000

[54] HIGH ALTITUDE AIRSHIP SYSTEM

[76] Inventor: Allen E. Paulson, P.O. Box 9660, 6001 Clubhouse Dr., Rancho Santa Fe, Calif. 92067

[21] Appl. No.: 09/300,941

[22] Filed: Apr. 28, 1999

[51] Int. Cl.[7] ...................................................... B64B 1/50
[52] U.S. Cl. .............................................. 244/24; 244/30
[58] Field of Search ................................ 244/24, 30, 31, 244/33, 29

[56] References Cited

U.S. PATENT DOCUMENTS

| | | | |
|---|---|---|---|
| 1,296,687 | 3/1919 | Nichols | 244/33 |
| 2,151,336 | 3/1939 | Scharlau | 250/11 |
| 2,433,344 | 12/1947 | Crosby | 244/33 |
| 2,681,774 | 6/1954 | Winzen et al. | 244/31 |
| 3,030,500 | 4/1962 | Katzin | 250/62 |
| 3,045,952 | 7/1962 | Underwood | 244/33 |
| 3,174,705 | 3/1965 | Schiff et al. | 244/1 |
| 3,270,895 | 9/1966 | Stewart | 212/71 |
| 3,395,877 | 8/1968 | MacFadden et al. | 244/33 |
| 3,446,457 | 5/1969 | Struble, Jr. | 244/30 |
| 3,521,836 | 7/1970 | Struble, Jr. | 244/33 |
| 3,881,531 | 5/1975 | Rossi | 73/170 R |
| 4,112,753 | 9/1978 | Call | 116/124 B |
| 4,120,259 | 10/1978 | Wilson | 244/83 |
| 4,365,772 | 12/1982 | Ferguson | 244/146 |
| 4,640,474 | 2/1987 | Manseth | 244/33 |
| 4,768,739 | 9/1988 | Schnee | 244/31 |
| 4,842,219 | 6/1989 | Jakubowski et al. | 244/25 |
| 4,842,221 | 6/1989 | Beach et al. | 244/33 |
| 4,995,572 | 2/1991 | Piasecki | 244/24 |
| 5,080,302 | 1/1992 | Hoke | 244/31 |
| 5,115,997 | 5/1992 | Peterson | 244/176 |
| 5,470,032 | 11/1995 | Williams, Jr. et al. | 244/30 |
| 5,645,248 | 7/1997 | Campbell | 73/170.08 |
| 5,646,343 | 7/1997 | Pritchard | 244/30 |
| 5,757,157 | 5/1998 | Falk et al. | 244/31 |

*Primary Examiner*—J. Woodrow Eldred
*Attorney, Agent, or Firm*—Brown, Martin, Haller & McClain, LLP

[57] ABSTRACT

An inflatable airship of predetermined volume is filled with gas to lift a predetermined weight to a predetermined high altitude. An elevator module is releasably secured to a gondola attached to the airship. A cable of a length at least equal to the deployment altitude of the airship has a first end attached to the elevator module and a second end attached to a winch mounted on the gondola. The airship is raised with the elevator module anchored to the ground and the cable is unwound from the winch as the airship rises. Once the desired operating altitude is reached, the winch is reversed to wind the cable onto the winch and raise the elevator module to the gondola.

37 Claims, 4 Drawing Sheets

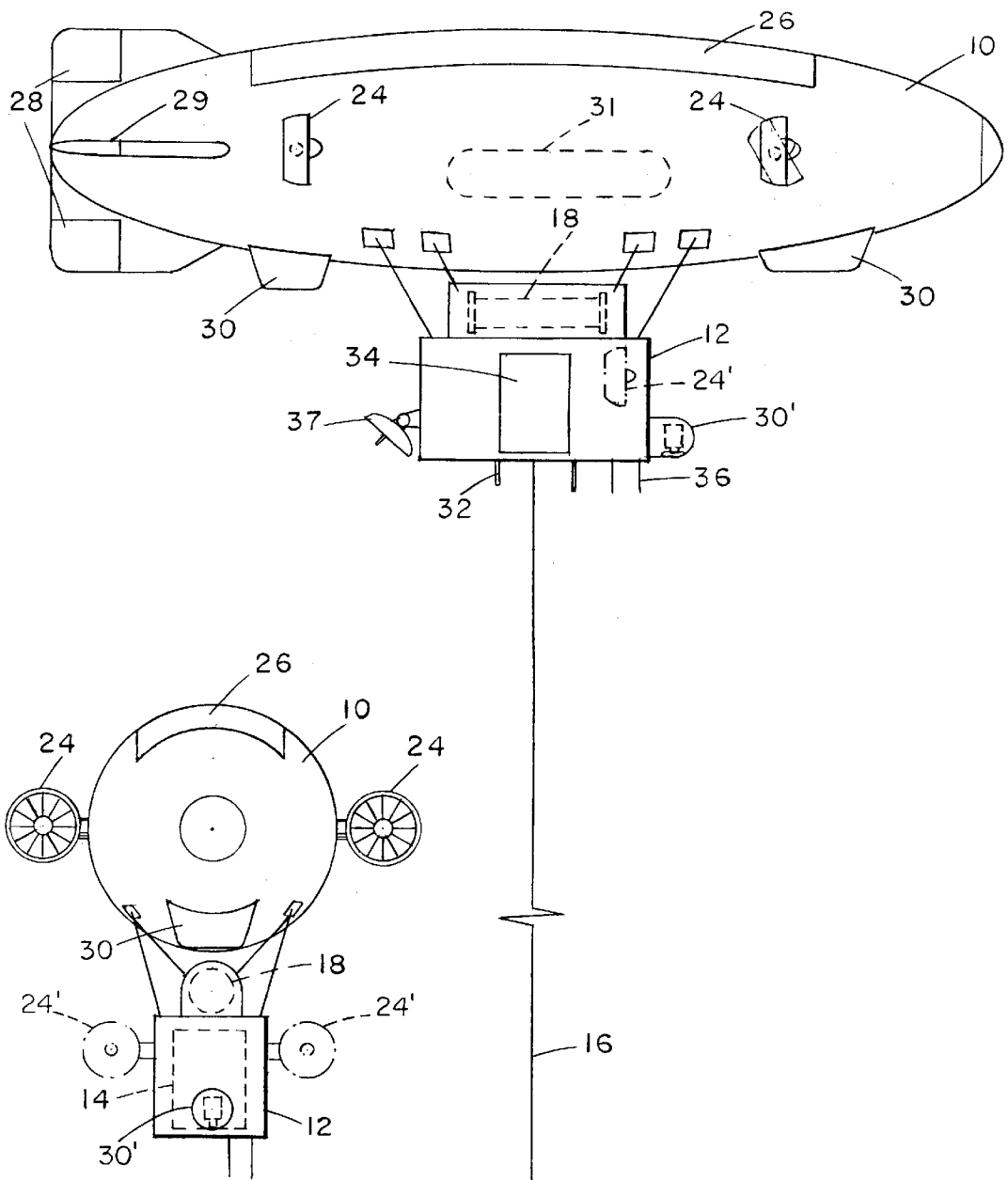

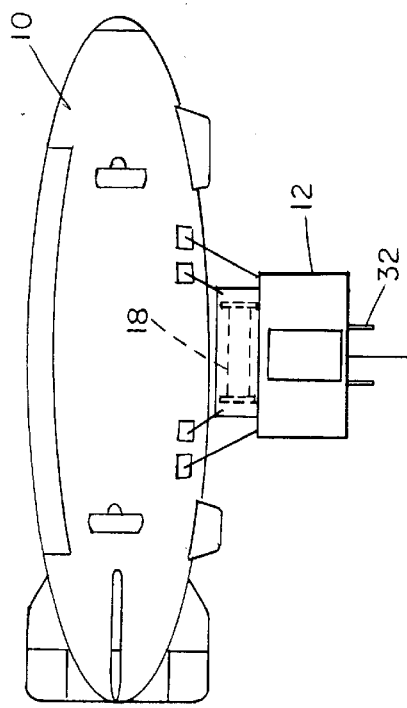
FIG. 5
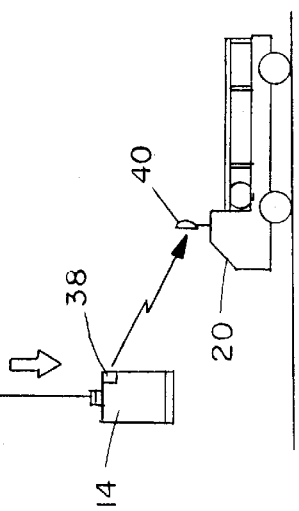
FIG. 6
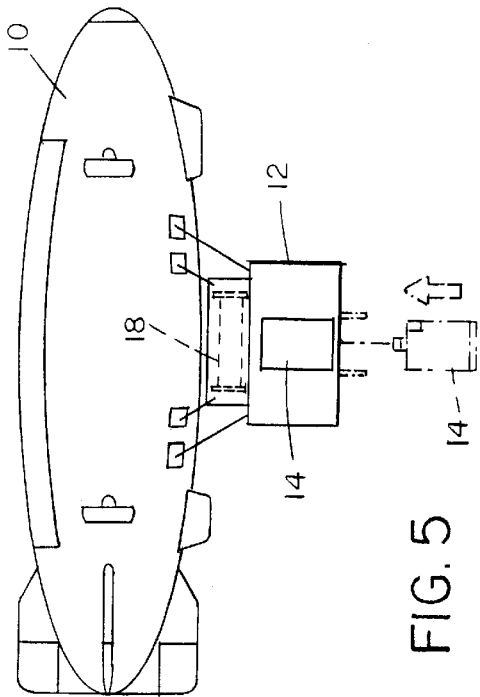
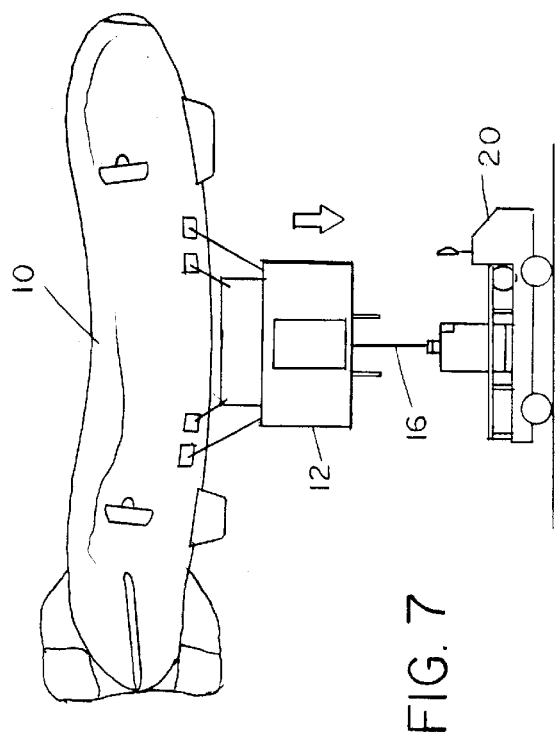
FIG. 7

HIGH ALTITUDE AIRSHIP SYSTEM

BACKGROUND OF THE INVENTION

The present invention relates generally to high altitude vehicles and is particularly concerned with a high altitude airship launch and retrieval system.

Currently, vehicles such as satellites, space shuttles, and the like must be launched to high altitudes by rockets. This requires enormous expenditure of fuel, and, absent very high geosynchronous orbit, do not maintain position relative to the earth. Thus, deployment of conventional satellites carrying communication devices or signaling systems is a very expensive proposition. If the equipment on the satellite should malfunction, retrieval and maintenance is often not cost-effective and may even be impossible.

It is known to use airships or dirigibles for low altitude applications, such as surveillance, signaling, collecting and transmitting meteorological data, and the like. These are typically permanently tethered to a fixed ground location and are deployed in the lower atmosphere. Such airships are described, for example, in U.S. Pat. No. 5,470,032 of Williams, Jr. et al., U.S. Pat. No. 4,120,259 of Wilson, U.S. Pat. No. 4,842,219 of Jakubowski et al., and U.S. Pat. No. 2,151,336 of U.S. Pat. No. 3,174,705 of Schiff describes deployment of a balloon-like vessel as a space station at a high altitude. The balloon is launched by filling it with helium or the like, and its lateral position is maintained for the first mile of ascent by means of a cable. The cable is then dropped, and the balloon continues to rise to an altitude of 65,000 feet. Although this is less expensive than a rocket launch system, it is subject to problems in accurate station-keeping during the remainder of its rise to the desired altitude, and there is no reliable means for recovery and maintenance.

SUMMARY OF THE INVENTION

It is an object of the present invention to provide a new and improved high altitude airship system, including means for launch and retrieval of the airship.

According to one aspect of the present invention, a high altitude airship system is provided, which comprises an inflatable airship adapted to be filled with gas and rise to a predetermined high altitude, a gondola secured to the airship, a weighted elevator module releasably securable to the gondola, a rotatable winch secured to the gondola, a cable having a first end attached to the elevator module and a second end attached to the winch on which the cable is wound when the elevator module is secured to the gondola, and a drive device for rotating the winch to unwind the cable as the airship is raised with the elevator module released from the gondola and remaining on the ground, and for rotating the winch in the opposite direction to wind the cable onto the winch and raise the elevator module to the gondola when the airship reaches a predetermined altitude.

In a preferred embodiment of the invention, the cable is of a length at least equal to the predetermined altitude at which the airship is to be deployed. The elevator module may be anchored to the ground and the cable unwound as the airship rises to its operating altitude, and then released. The winch is then reversed to wind up the cable and pull the elevator module up to the gondola. Alternatively, the airship may be raised to a lower altitude, and the cable wound up to raise the elevator module up to the airship. The assembly then rises to the higher, operating altitude of the airship.

Preferably, the airship is designed to rise to an altitude of more than 40,000 feet, and in a preferred embodiment it is designed for operation in the altitude range from 75,000 to 85,000 feet. The cable length is therefore preferably also in the range from 75,000 to 85,000 feet, and the cable is of a suitable very high strength, flexible, and lightweight material.

In a preferred embodiment of the invention, the airship is of an elongated, aerodynamic shape similar to that of a conventional blimp, and has suitable propulsion means for station-keeping purposes. The airship volume will be much greater than a conventional blimp, however, and will be sufficient to lift the required weight to the predetermined altitude. The airship may be arranged to have 0 to 10,000 lbs. positive buoyancy, and preferably has a maximum of around 4,000 lbs. positive buoyancy. A controlled helium supply is preferably provided within the airship, along with controlled venting for buoyancy adjustment.

Communication devices such as receiving and transmitting antennae, of the type conventionally installed in communications satellites, are mounted in the airship. These may comprise RF communication link devices for television, radio, portable phones, microwaves, and the like. Additionally, a transmitter or transponder is provided in the elevator module. This may be used for location purposes when the balloon is lowered. A suitable launch and retrieval vehicle is provided for positioning the airship during launch and supplying gas to inflate the airship envelope, and also for tracking and retrieving the airship when required for maintenance or replacement purposes. The retrieval vehicle will be provided with a suitable receiver for tracking signals emitted by the transmitter or transponder on the elevator module. The system may use the Global Positioning System (GPS) or triangulation techniques for tracking purposes. Preferably, the weighted elevator module is capable of carrying payload to and from the gondola. The gondola may be designed to be manned or unmanned. If the gondola is manned, the elevator module preferably has a pressurized passenger cabin for transporting personnel to and from the airship.

A suitable power supply will be provided in the airship and/or gondola for providing power to operate engines or other propulsion devices for positioning the airship when it reaches the desired altitude, and also for operating the cable winch. The power supply may comprise batteries, a stored fuel supply, solar power, or microwave power, for example. The airship drive control may use GPS for accurate positioning or station-keeping purposes, to keep the airship at a predetermined position above the earth, within acceptable limits.

According to another aspect of the present invention, a method of deploying an airship to a predetermined high altitude is provided, which comprises the steps of:

supplying gas to an airship of predetermined volume to raise a predetermined weight to a predetermined high altitude while the airship is on the ground, such that the gas causes the airship to rise to the predetermined high altitude;

as the airship rises, gradually unwinding a cable having a length equivalent to the predetermined high altitude from a winch secured to the airship so that the cable is completely unwound from the winch when the airship reaches the predetermined altitude, with a first end of the cable secured to the winch and a second end of the cable secured to a weighted elevator module on the ground; and when the airship reaches the predetermined altitude, winding the cable back onto the winch in order to raise the weighted elevator module from the ground up to the airship.

Alternatively, the airship may be raised along with the elevator module to the desired operating altitude, or may be raised to an intermediate altitude while tethered to the elevator module, with the elevator module then being raised to the airship to continue up with the airship to the operating altitude.

The elevator module may be periodically lowered back to the ground and raised up to the airship during operation, for example for re-supply purposes, or for raising and lowering personnel where the airship is designed to be manned or periodically manned for maintenance purposes. Preferably, the method includes retrieving the airship at the end of a period of operation when required for maintenance or replacement purposes, by first lowering the weighted elevator module to the ground while unwinding the cable from the winch, tracking a transponder in the elevator module as it is lowered from a retrieval vehicle, driving the retrieval vehicle to the location of the elevator module, and securing the elevator module and winding the cable onto the winch while releasing gas from the airship for controlled descent of the airship to the location of the elevator module.

This system and method has many advantages. First, it provides a relatively inexpensive system for launching satellite equipment, and is potentially much more reliable than a conventional rocket launch in deploying such equipment in space. Secondly, it provides a convenient module for raising equipment and/or personnel up to the airship, and for lowering equipment and/or personnel back to the ground without lowering the airship itself. Thirdly, reliable retrieval of the airship itself is provided, so that the airship envelope or other equipment may be readily repaired or replaced.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which:

FIG. 1 is a side view illustrating an airship system according to a preferred embodiment of the present invention, with the airship tethered to a grounded elevator module or capsule;

FIG. 2 is a front view of the airship;

FIG. 5 is a similar view showing the airship at altitude with the module drawn into the gondola;

FIG. 6 is a similar view showing the lowering of the module and detection by the support vehicle;

FIG. 7 shows the recovery of the system with the balloon being deflated;

DESCRIPTION OF THE PREFERRED EMBODIMENT

Figure 3:
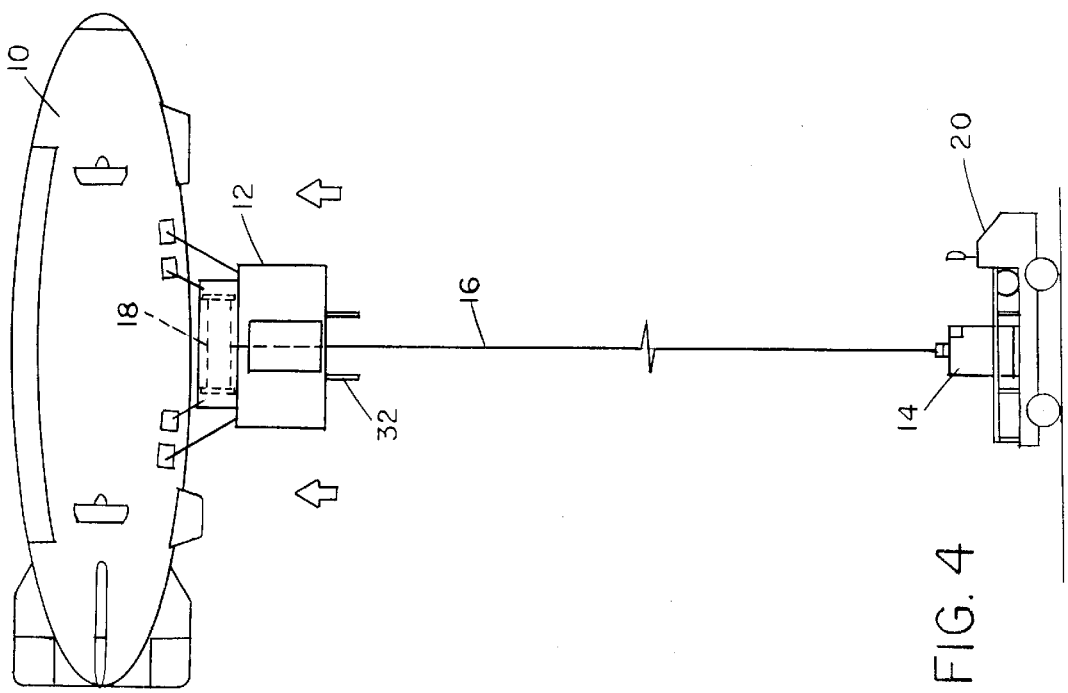
FIG. 3 is a view similar to FIG. 1, showing the initial inflation and launching of the airship from a support vehicle.

FIGS. 1 and 2 of the drawings illustrate a high altitude airship system according to a preferred embodiment of the present invention, while FIGS. 3 to 8A/B illustrate the preferred method of deploying and retrieving the airship.

As illustrated in FIGS. 1 and 2, the system basically comprises a balloon or airship 10 adapted to be filled with a suitable gas such as helium, a gondola or housing 12 suspended from the airship, an elevator module 14, and a tether cable 16 having a first end secured to the elevator module 14 and a second end secured to a power winch 18 on the gondola. The system also includes a launch and retrieval vehicle 20 on the ground 22.

The airship 10 is of a suitable elongated, aerodynamic shape, as illustrated in FIG. 1, and preferably has one, two or more engines, jets, rockets or propellers 24 on each side for positioning purposes. Other positioning devices such as controllable venting may be provided. The propellers may alternatively be positioned on opposite sides of the gondola, as illustrated at 24' in dotted outline in FIG. 2. The engines are connected to a suitable power supply (not illustrated) in the vehicle. The engines may be solar powered, and solar panels 26 may be provided on the upper side of the airship for power collection purposes. The power supply, or an additional power supply, will also be connected to the winch 18 for winding cable 16 onto and off the winch. Any suitable power supply may be used, such as any liquid or gaseous fuel, electricity from batteries, solar power, or microwave power, for example. Rudders 28 and elevators 29 are also provided at the rear end of the airship. Housings 30 for infra-red or visual surveillance cameras are provided on the lower side of the airship. Alternatively, or additionally, one or more cameras 30' may be mounted on the gondola.

The airship is of sufficient volume to raise a predetermined weight to a very high altitude, greater than 40,000 feet, and preferably to an altitude in the range from 75,000 to 85,000 feet. It preferably has a controllable positive buoyancy in the range from 0 lbs. to 10,000 lbs., with a preferred maximum positive buoyancy of 4,000 lbs. to ensure that the tension on the tether cable is not too high. A controlled gas supply 31 is provided in the airship, along with vents (not shown) for adding or removing gas to adjust buoyancy. Releasable weights, i.e. water (not shown), are preferably also provided for buoyancy adjustment. These may be designed to dissipate in space on release.

The gondola may contain various control systems, such as environmental, electronic, and engine controls. The gondola has retractable doors 32 on its lower side for access to an internal cavity or landing space 34 for receiving the elevator module 14, as will be described in more detail below. Communication antennae 36,37 are suitably mounted on the gondola for RF communications such as television, radio, or portable phone signals and the like.

The system may be designed to be permanently unmanned, permanently manned, or manned only for maintenance purposes. If the airship is to be manned some or all of the time, the gondola and optionally portions of the interior of the airship will be pressurized, preferably to 12 psi, for an effective altitude of 6,000 ft., and supplied with air. The module preferably has an upper cabin or payload space 35 and a lower weighted portion 39. Weights may be removably positioned in region 39, for example, to assist in lowering the module. The elevator module may also be pressurized if it is to be used to transport personnel. Alternatively, it may be designed to transport payload only. A transponder or signaling device 38 is provided on the elevator module. A suitable receiver 40 is mounted on the launch/retrieve vehicle 20 for tracking the elevator module, preferably using GPS or triangulation for location. A winch 41 is preferably also provided on vehicle 20.

The length of the rope or cable 16 will be at least equal to the desired elevation height of the airship 10. Thus, if the elevation is 75,000 to 85,000 feet, the cable 16 will be at least 75,000 to 85,000 in length. The cable is of a suitable high strength, lightweight, flexible material. One possible cable material is Spectwelve 100% Spectra 12 Strand Cable manufactured by New England Ropes of Fall River, Me. Carbon fiber cable may also be used. A suitable drive system employing a motor, speed clutch control, gears, brakes, and suitable cable guides, may be used to wind the cable onto and off the winch.

Figure 4:
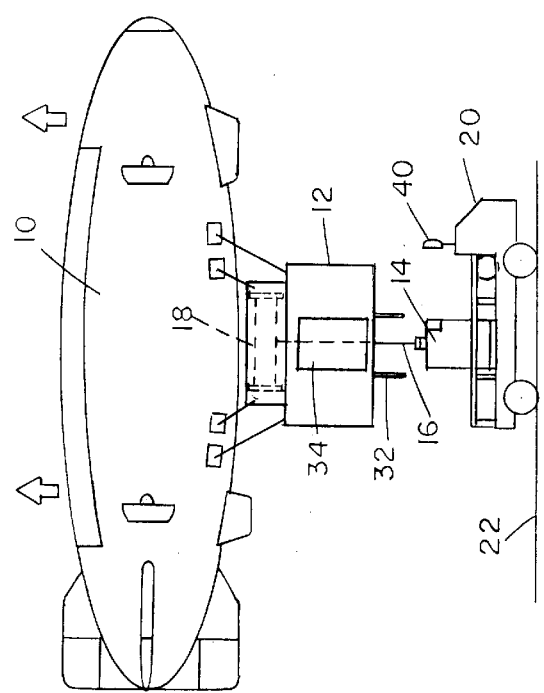
FIG. 4 is a similar view showing the controlled ascent of the airship.

Operation of the system will now be described in more detail with reference to FIGS. 3 to 8. FIGS. 3 to 5 and 8A illustrate the method of launching the airship to the desired elevation. FIG. 3 illustrates the first stage in which the launch/retrieve vehicle 20 has been driven to a selected launch site carrying the uninflated airship, gondola, and elevator module (step 42 of FIG. 8A). The elevator module will be initially contained within the gondola and the entire assembly will be anchored to the vehicle 20. Once on site, the airship is inflated with gas from a supply (not illustrated) on the vehicle (step 44). When the airship is fully inflated, it is released (46) and will start to rise. At the same time, the elevator doors 32 are opened with the elevator module 14 released from the gondola and anchored to the vehicle 20. Thus, the airship and gondola will rise away from the elevator module and vehicle 20, as illustrated in FIG. 3. At the same time, the winch 18 is operated to unwind the cable 16 as the airship rises (48), as illustrated in FIG. 4. The cable continues to unwind until the airship reaches the predetermined operating altitude (step 50), which is preferably in the range from 75,000 to 85,000 feet, i.e. above the troposphere. The use of a tether cable which is unwound as the airship rises will provide more accurate control of the airship position and prevent major lateral shifting of the airship due to winds or the like. The launch of the airship will be controlled as to time and location to avoid jet streams.

Figure 8A:
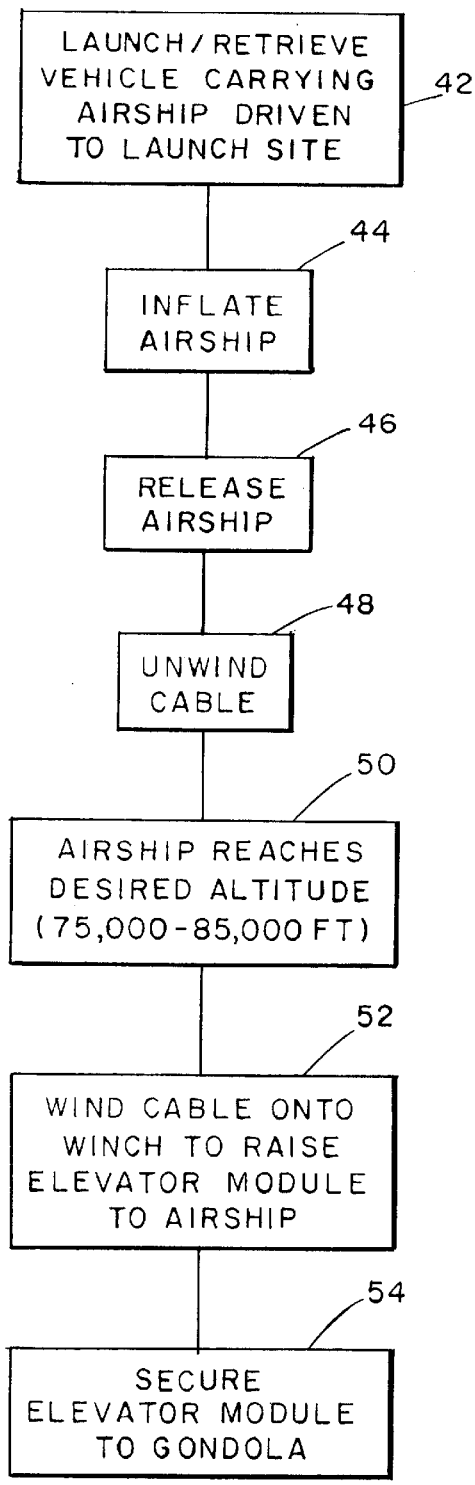
FIGS. 8A and 8B are flow diagrams illustrating operation of the system to raise and lower the airship, respectively.

Once the airship has reached the desired operating altitude, the elevator module or pod 14 is released from the vehicle 20, and the winch 18 is actuated to wind the cable 16 up, raising the elevator module to the gondola, as illustrated in FIG. 5 (step 52 of FIG. 8A). The cable will be wound up until the module 14 is raised into the cavity 34 and the doors 32 are closed (54).

Although the airship is raised to its desired operating altitude with the elevator module on the ground and the cable continuously unwinding as it rises in the preferred embodiment, other launch methods are possible. For example, the airship may rise only part of the distance towards the operating altitude before winding up the cable to raise the elevator module. The airship then continues to rise to operating altitude with the elevator module. Another option is to raise the airship from the ground with the elevator module, with the elevator module then usable for re-supply purposes.

The airship may be deployed in a station-keeping mode of operation above the earth, with the propellers or other drive means suitably used to maintain the proper position. The airship may have a remote control positioning system and/or an auto-pilot system for positioning. This may use GPS for accurate positioning. Once deployed, the airship operates generally as a communications satellite for receiving transmissions from the ground, and relaying them back to the ground or to other satellites in a known manner. The airship is equipped with cameras for optical or infra red surveillance purposes, as described above.

The airship and gondola may be manned or unmanned. If manned, it may have space for 1 or more passengers. If adapted to be manned, the airship will be pressurized. It may then also be used for recreational purposes, and people may be transported to and from the airship or gondola using the elevator module, which may also be pressurized for this purpose. The elevator module preferably has a quick disconnect device 56 for quick disconnect from the cable in emergency situations, and preferably has an automatic parachute which is deployed in such emergencies. This allows for an emergency escape from the gondola. The elevator module may also be employed to move equipment back to the ground for maintenance or replacement, or to move maintenance personnel and/or equipment, such as electronics, transponders, and the like up to the gondola for carrying out servicing or repairs. Robotic systems may be provided in the gondola for automatic equipment replacement purposes.

Figure 8B:
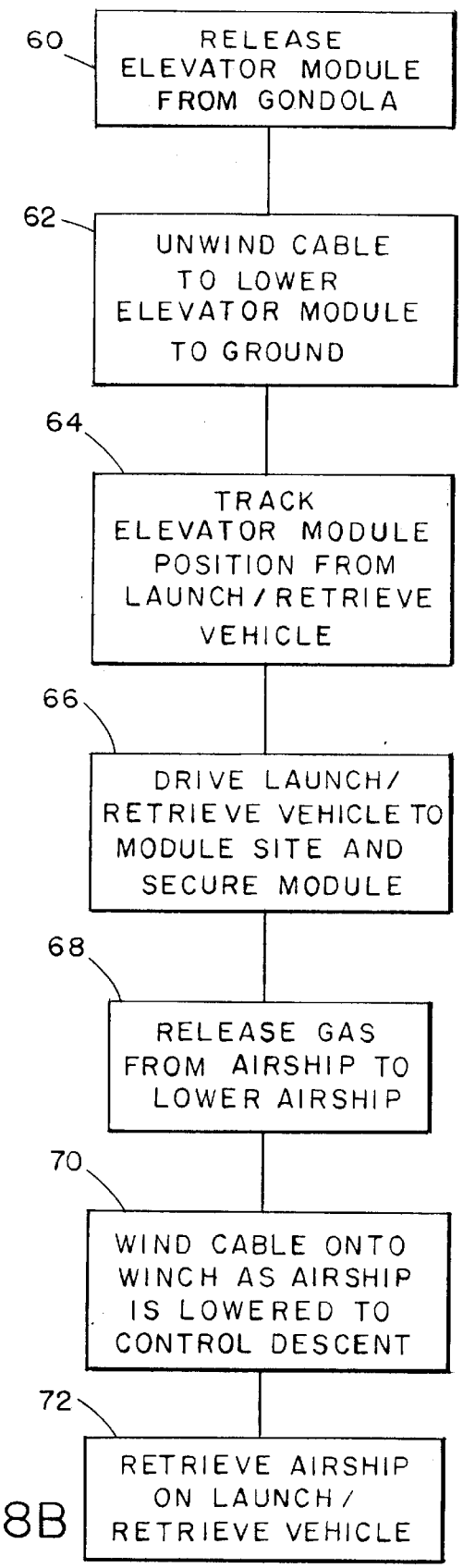

It is intended that the airship will be operational for extended periods of time. However, it may eventually be necessary to recover the airship in order to repair the housing or other equipment, or to update the communications equipment, for example. The system of this invention also allows for reliable retrieval of the airship and all associated equipment, as generally illustrated in FIGS. 6,7, and 8B. Currently, satellites either cannot be recovered and must be replaced in their entirety at great expense, or can only be recovered by a space vehicle such as a space shuttle, also at great expense. The recovery system of this invention is inexpensive, easy to operate, and convenient.

The first step 60 in lowering and retrieving the airship system is to open the elevator doors 32 and release the elevator module 14. The winch 18 is then actuated in the opposite direction to that of step 52 in order to unwind the cable 16 and lower the elevator module 16, as illustrated in FIG. 6 (step 62 of FIG. 8B). At the same time, the retrieval vehicle 20 uses receiver 40 to track signals from transponder 14, and is driven in the general direction of the signals (step 64). Once the module 14 reaches the ground and the vehicle 20 reaches the landing site, the module 14 will be anchored to the vehicle (step 66) as illustrated in FIG. 7. Gas is then released from the airship (68) while the winch is actuated in order to wind the cable 16 back onto the winch (70) in order to guide the airship's descent. Optionally, instead of using winch 18 when lowering the airship, the cable may be detached from the elevator module on the ground and attached to the ground-based winch 41. Winch 41 is then actuated to wind up the cable and may provide some pulling force for lowering the airship. FIG. 7 illustrates the deflated airship approaching the retrieval vehicle. The airship is then retrieved and attached to the vehicle 20 for transport to a maintenance or service facility (72).

Alternatively, the airship may be lowered with the elevator module to a lowered altitude before releasing the elevator module and lowering it to the ground.

Figure 9:
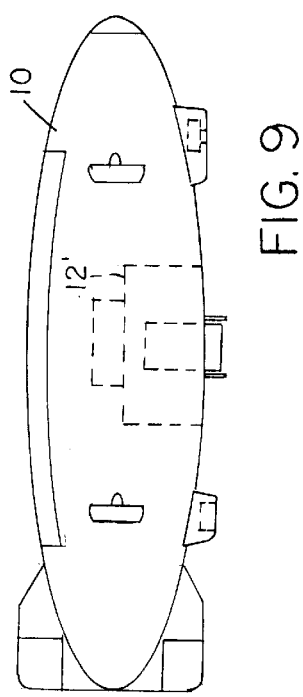
FIG. 9 is a side view illustrating an airship according to another embodiment of the invention.

FIG. 9 illustrates a modification in which the gondola or housing 12' is mounted within the airship body rather than being suspended from the airship. Operation of the system is otherwise identical to that described above in connection with FIGS. 1 to 8. This arrangement has some advantages, since the aerodynamic shape of the airship is not affected by a suspended gondola, and the gondola is retained in a more protected environment within the airship.

The high altitude airship system of this invention provides an inexpensive and reliable alternative to conventional satellite launch systems. The launch costs will be significantly lower than for a rocket launch of a satellite, and the airship can carry essentially the same equipment as a satellite and perform some or all of the tasks currently performed by satellites, such as surveillance and various types of communications. The operational costs are close to zero, while the entire system may be readily recovered as necessary, unlike a satellite which is either simply non-recoverable or requires an expensive space shuttle recovery.

The airship is suitably equipped for accurate and reliable station-keeping. Receiving antennae are preferably provided for GPS positioning purposes, and an automatic control system actuates drive devices such as engines, jets, or vents to move the airship to the desired location based on its detected position. Thus, more accurate station-keeping is possible.

The system of this invention is also capable of carrying out many additional operations not currently possible with satellites. The elevator module and tether system provides precise positioning both on launch and recovery, and additionally can act as a re-supply module during use. It can also act as a passenger elevator to raise and lower personnel to and from the airship, both for maintenance and for recreational purposes.

Although a preferred embodiment of the invention has been described above by way of example only, it will be understood by those skilled in the field that modifications may be made to the disclosed embodiment without departing from the scope of the invention, which is defined by the appended claims.

I claim:

1. A high altitude airship system, comprising:
an inflatable airship of predetermined volume adapted to be filled with gas and to rise to a predetermined high altitude;
a gondola secured to the airship;
a weighted elevator module releasably securable to the gondola;
a rotatable winch secured to the gondola;
a cable having a first end attached to the elevator module and a second end attached to the winch on which the cable is wound when the elevator module is secured to the gondola; and
a drive device for rotating the winch to unwind the cable as the airship separates from the elevator module, and for rotating the winch in the opposite direction to wind the cable onto the winch and raise the elevator module to the gondola when the airship reaches the predetermined high altitude.

2. The system as claimed in claim 1, wherein the cable is of a length at least equal to the predetermined altitude at which the airship is to be deployed.

3. The system as claimed in claim 2, wherein the cable length is greater than 40,000 feet.

4. The system as claimed in claim 3, wherein the cable length is in the range from 75,000 to 85,000 feet.

5. The system as claimed in claim 1, wherein the airship is adapted to rise to an altitude of more than 40,000 feet.

6. The system as claimed in claim 5, wherein airship is adapted to rise to an elevation in the range from 75,000 to 85,000 feet.

7. The system as claimed in claim 1, wherein the airship is of an elongated, aerodynamic shape.

8. The system as claimed in claim 1, wherein the gondola is suspended from the airship.

9. The system as claimed in claim 1, wherein the gondola is mounted within the airship.

10. The system as claimed in claim 1, wherein communication antennae are secured to the gondola.

11. The system as claimed in claim 1, including a transmitter on the elevator module for transmitting location signals.

12. The system as claimed in claim 1, including at least one launch and retrieve vehicle for launching and retrieving the airship, the vehicle having a receiver for receiving location signals from the elevator module in order to track the location of the module.

13. The system as claimed in claim 1, wherein the elevator module has a pressurized passenger cabin.

14. The system as claimed in claim 1, wherein the gondola has a pressurized personnel cabin.

15. The system as claimed in claim 1, wherein the elevator module has cargo space for carrying cargo to and from the gondola.

16. The system as claimed in claim 1, wherein the airship has a plurality of propellers and an engine for driving the propellers, and a power supply for operating the engine and the winch drive device.

17. The system as claimed in claim 16, wherein the gondola is suspended from the airship and the propellers are provided on the gondola.

18. The system as claimed in claim 16, wherein the power supply comprises solar panels on the airship.

19. The system as claimed in claim 1, wherein the airship has drive means for moving the airship, and position control means for determining airship position relative to the Earth and for operating the drive means to move the airship to a predetermined operating position above the Earth.

20. The system as claimed in claim 1, wherein the gondola has a lower wall facing the ground, an elevator door in the lower wall movable between an open position and a closed position, and a cavity for receiving the elevator module in the gondola aligned with the elevator doors, the elevator module being raised into the cavity through the open elevator door when the cable is fully wound onto the winch.

21. The system as claimed in claim 1, including at least one surveillance camera secured to the airship.

22. A method of deploying an airship to a predetermined high altitude, comprising the steps of:
supplying gas to an airship while the airship is anchored on the ground, the airship being of predetermined volume to raise a predetermined weight to a predetermined high altitude;
releasing the airship such that the gas causes the airship to rise to the predetermined high altitude;
as the airship rises, gradually unwinding a cable from a winch secured to the airship so that the cable is unwound continuously from the winch as the airship rises at least part of the distance to the predetermined altitude, with a first end of the cable secured to the winch and a second end of the cable secured to a weighted elevator module on the ground; and
winding the cable back onto the winch in order to raise the weighted elevator module from the ground up to the airship.

23. The method as claimed in claim 22, wherein the cable has a length at least equal to the predetermined altitude, the cable is unwound continuously as the airship rises to the predetermined altitude, and the cable is wound onto the winch to raise the elevator module up to the airship at the predetermined altitude.

24. The method as claimed in claim 22, including the step of periodically lowering the elevator module back to the ground to retrieve payload and raising the module and payload back up to the airship.

25. The method as claimed in claim 24, wherein the payload includes at least one passenger.

26. The method as claimed in claim 22, including retrieving the airship after an extended period of operation at high altitude, comprising the steps of unwinding the cable to lower the elevator module back to a landing site on the ground, providing a location signal from the elevator module as it is lowered, tracking the location signal from a retrieval vehicle and driving the vehicle towards the elevator module landing site, securing the elevator module at the landing site, and lowering the airship while winding the cable back onto the winch to guide the airship down to the landing site.

27. The method as claimed in claim 22, wherein the airship is raised to an altitude of greater than 40,000 feet.

28. The method as claimed in claim 27, wherein the airship is raised to an altitude in the range from 75,000 to 85,000 feet.

29. The method as claimed in claim 22, including the step of providing antennae on the airship for RF communications.

30. The method as claimed in claim 22, including the step of controlling buoyancy by controlled addition of gas to the airship and venting of gas from the airship.

31. The method as claimed in claim 30, wherein the buoyancy is controlled such that the maximum positive buoyancy is in the range from 0 lbs. to 10,000 lbs.

32. The method as claimed in claim 30, wherein the buoyancy is controlled such that the maximum positive buoyancy is no greater than 4,000 lbs.

33. The method as claimed in claim 24, wherein weight is added to the elevator module prior to lowering it to the ground.

34. The method as claimed in claim 22, including the steps of lowering the airship to a lower altitude, and unwinding the cable to lower the elevator module from the lower altitude to the ground.

35. The method as claimed in claim 34, including the steps of adding payload to the elevator module, winding the cable back on to the winch to raise the elevator module and payload up to the airship, and raising the airship and elevator module up to the predetermined altitude.

36. The method as claimed in claim 34, including the step of winding the cable onto the winch while lowering the airship down to the elevator module on the ground.

37. A method of operating an airship, comprising the steps of:

supplying gas to an airship while the airship is on the ground, the airship being of predetermined volume to raise a predetermined weight to a predetermined high altitude;

releasing the airship such that it rises to the predetermined altitude;

periodically lowering an elevator module to the ground from the airship by gradually unwinding a cable from a winch secured to the airship, the cable having a first end secured to the airship and a second end secured to the elevator module;

loading payload and/or personnel into the elevator module; and raising the module and payload back up to the airship by winding the cable back onto the winch.

* * * * *